INVENTOR.
HENRY W. WALLACE
BY
Synnestvedt & Lechner
ATTORNEY

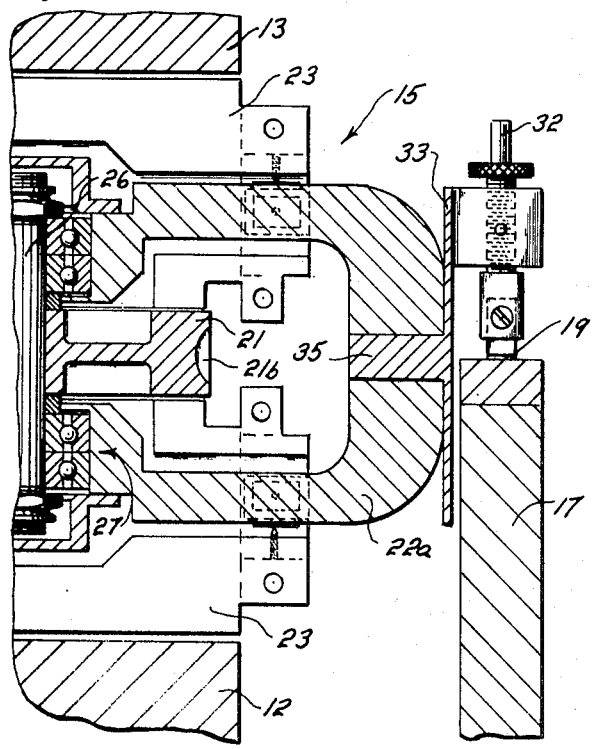
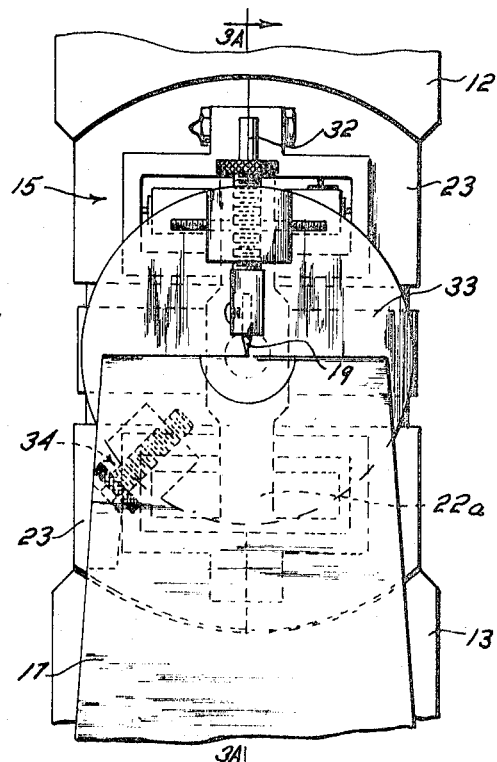
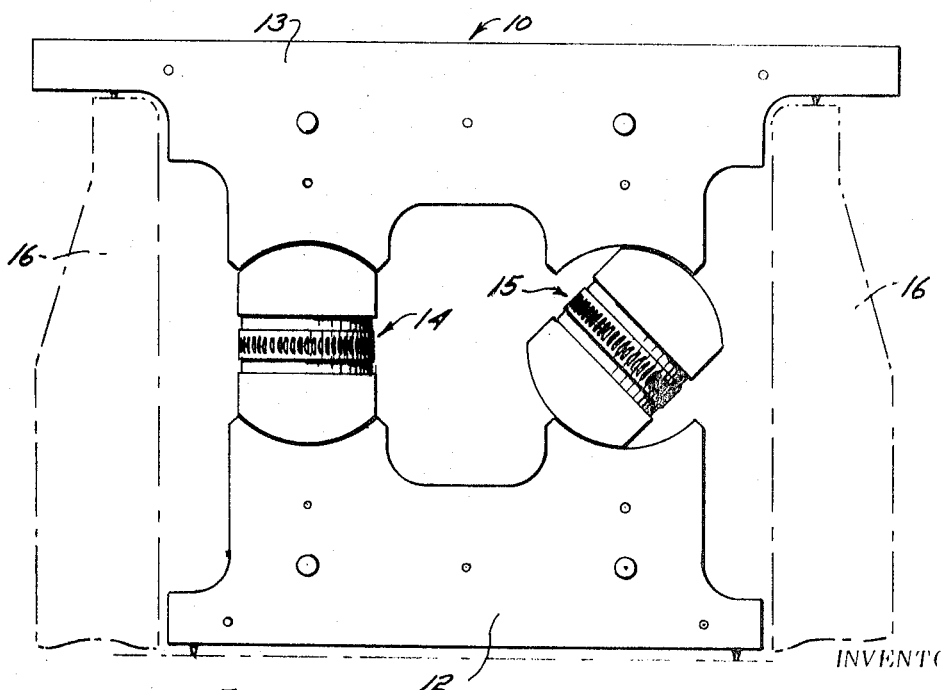

INVENTOR.
HENRY W. WALLACE
ATTORNEYS

Dec. 14, 1971   H. W. WALLACE   3,626,605
METHOD AND APPARATUS FOR GENERATING A SECONDARY
GRAVITATIONAL FORCE FIELD
Filed Nov. 4, 1968   6 Sheets-Sheet 4

INVENTOR.
HENRY W. WALLACE
BY
Synnestvedt & Lechner
ATTORNEYS

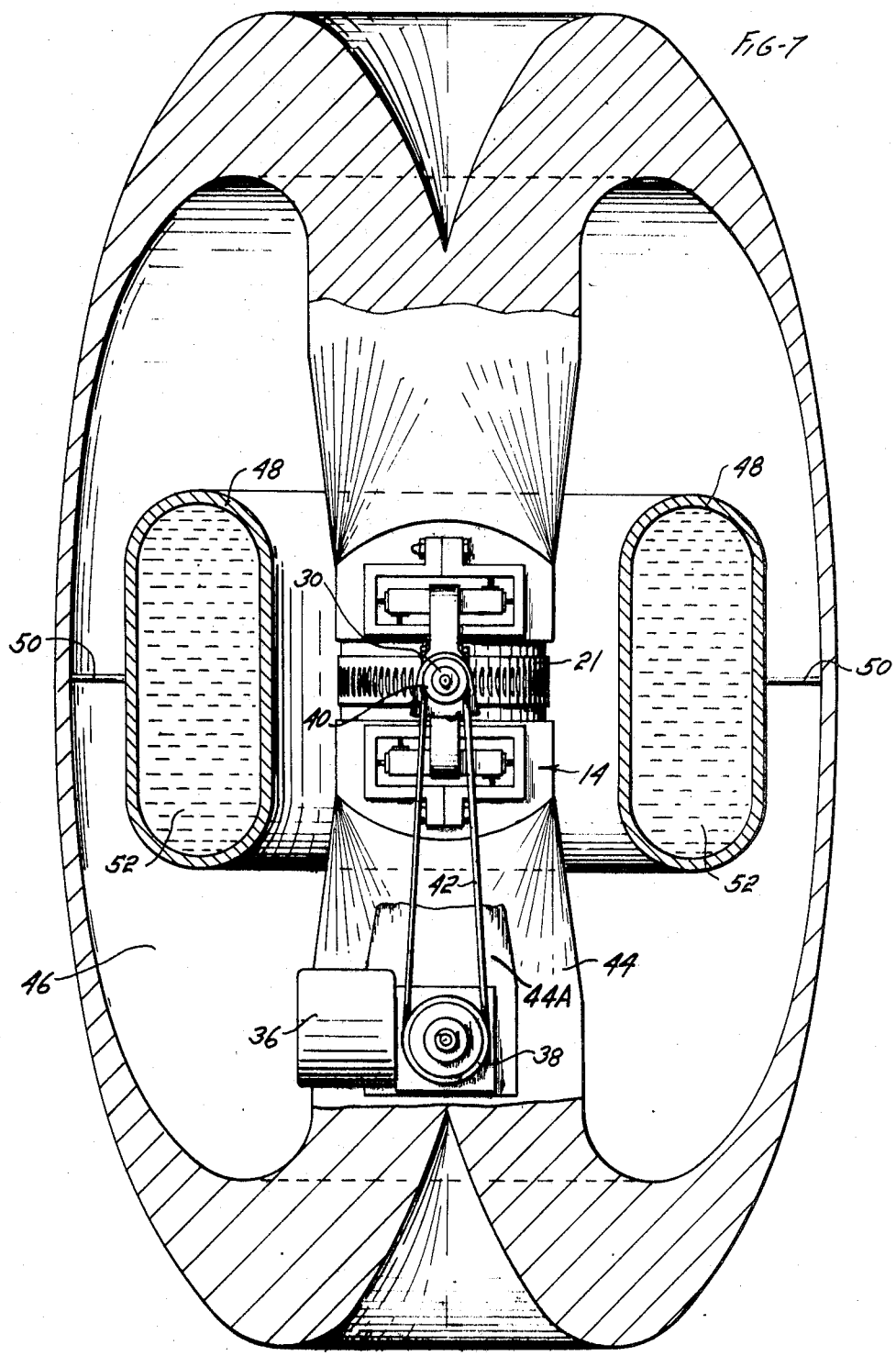

United States Patent Office 3,626,605
Patented Dec. 14, 1971

3,626,605
METHOD AND APPARATUS FOR GENERATING A SECONDARY GRAVITATIONAL FORCE FIELD
Henry Wm. Wallace, Ardmore, Pa.
(803 Cherry Lane, Laurel, Miss. 39440)
Filed Nov. 4, 1968, Ser. No. 773,051
Int. Cl. G09b 23/06
U.S. Cl. 35—19
10 Claims

ABSTRACT OF THE DISCLOSURE

Apparatus and method for generating a time variant non-electromagnetic force field due to the dynamic interaction of relatively moving bodies and for transforming such force fields into energy for doing useful work.

The method of generating such time variant force fields including the steps of juxtaposing in field series relationship a stationary member of spin nuclei material, and a member capable of assuming relative motion with respect to said stationary member also characterized by spin nuclei material; initiating relative motion by rotation of said one member with respect to the other, which rotational motion may occur both about an axis within the plane of said other member and about an axis perpendicular thereto; whereby the rotational motion of said one member about the axis perpendicular to the plane of said other member results in the dual interaction of the angular momentum property of said one member with inertial space and also with respect to the angular momentum property of said other member thereby resulting in a dynamic interaction field arising through gravitational coupling which dynamic interaction field is further characterized by its nonelectromagnetic nature and its mass-proximity and relative motion dependency; the rotation of said one member about the axis within the plane of said other member further resulting in an undulation of the dynamic interaction field within said other member which in turn gives rise to a secondary time-variant gravitational field in the surrounding space.

The present invention relates to an apparatus and method for generating a time-variant force field due to the relative motion of moving bodies; which force field exhibits itself in the form of an induced secondary gravitational force. As such, this invention constitutes a continuation-in-part of an application filed Nov. 4, 1968 by the same inventor, entitled Method and Apparatus for Generating a Dynamic Force Field and bearing Ser. No. 773,116.

In the practice of the present invention it has been found that when bodies composed of certain material are placed in relative motion with respect to one another there is generated an energy field therein not heretofore observed. This field is not electromagnetic in nature; being by theoretical prediction related to the gravitational coupling of relatively moving bodies.

The initial evidence indicates that this nonelectromagnetic field is generated as a result of the relative motion of bodies constituted of elements whose nuclei are characterized by half integral "spin" values, the spin of the nuclei being associated with the net angular momentum of the nucleons thereof. The nucleons in turn comprise the elemental particles of the nucleus; i.e., the neutrons and protons. For purposes of the present invention the field, generated by the relative motion of materials characterized by a half integral spin value, is referred to as a "kinemassic" force field.

It will be appreciated that relative motion occurs on various levels, i.e., there may be relative motion of discrete bodies as well as of the constituents thereof including, on a subatomic level, the nucleons of the nucleus. The kinemassic force field under consideration is a result of such relative motion, being a function of the dynamic interaction of two relatively moving bodies including the elemental particles thereof. The value of the kinemassic force field created, by reason of the dynamic interaction of the bodies experiencing relative motion, is the algebraic sum of the fields created by reason of the dynamic interaction of both elementary particles and of the discrete bodies.

For a closed system comprising only a stationary body, the kinemassic force, due to the dynamic interaction of the subatomic particles therein, is zero because of the random distribution of spin orientations of the respective particles. Polarization of the spin components so as to align a majority thereof in a preferred direction establishes a flux field aligned with the spin axes of the elementary particles. The present invention is in part comprised of an apparatus for polarizing its spin nuclei material, while additional means are provided to induce an alternating or undulating effect in the kinemassic field so generated.

Accordingly, a primary object of the present invention concerns the provision of means for generating a time-variant kinemassic field within a permeable field body due to the dynamic interaction of relatively moving bodies and the relative rotation of said generating means with respect to the permeable field body.

The kinemassic force field finds theoretical support in the laws of physics, being substantiated by the generalized theory of relativity. According to the general theory of relativity there exists not only a static gravitational field but also a dynamic component thereof due to the gravitational coupling of relatively moving bodies.

This theory proposes that two spinning bodies will exert force on each other. Heretofore the theoretical predictions have never been experimentally substantiated; however, as early as 1896, experiments were conducted in an effort to detect predicted centrifugal forces on stationary bodies placed near large, rapidly rotating masses. The results of these early experiments were inconclusive, and little else in the nature of this type of work is known to have been conducted.

It is therefore another object of the present invention to set forth an operative technique for generating a measurable time-variant force field due to the gravitational coupling of relatively moving bodies.

In carrying out the present invention, means are provided to enable the relative rotational motion of a first member with respect to a stationary member positioned in close proximity thereto; the construction of one embodiment of the first member being such as to enable portions thereof to assume rotational motion about an axis perpendicular to the plane of said stationary member. The effect of the rotation of said member about the axis perpendicular to the plane of the stationary member is to establish a kinemassic force field in the nature of that referred to in the aforementioned copending application of the same inventor. The rotation of said member about the axis lying within the plane of said stationary member results in an undulation of the dynamic interaction field within said field members which in turn induces a secondary time-variant gravitational field in the surrounding space.

Accordingly, another more specific object of the present invention concerns a method of generating a non-electromagnetic force field due to the dynamic interaction of relatively moving bodies and for utilizing such force field to further generate a secondary gravitational field.

The foregoing objects and features of novelty which characterize the present invention, as well as other objects of the invention, are pointed out with particularity in the claims annexed to and forming a part of the present specification. For a better understanding of the invention, its advantages and specific objects allied with its use, reference should be made to the accompanying drawings and descriptive matter in which there is illustrated and described a preferred embodiment of the invention.

In the drawings:

FIG. 2 is an isolation schematic of apparatus components comprising the time-variant kinemassic field circuit of FIG. 1;

FIGS. 3, 3A, 3B, 4 and 5 show the details of construction of the generator and detector assemblies of FIGS. 1 and 2;

Figure 1:
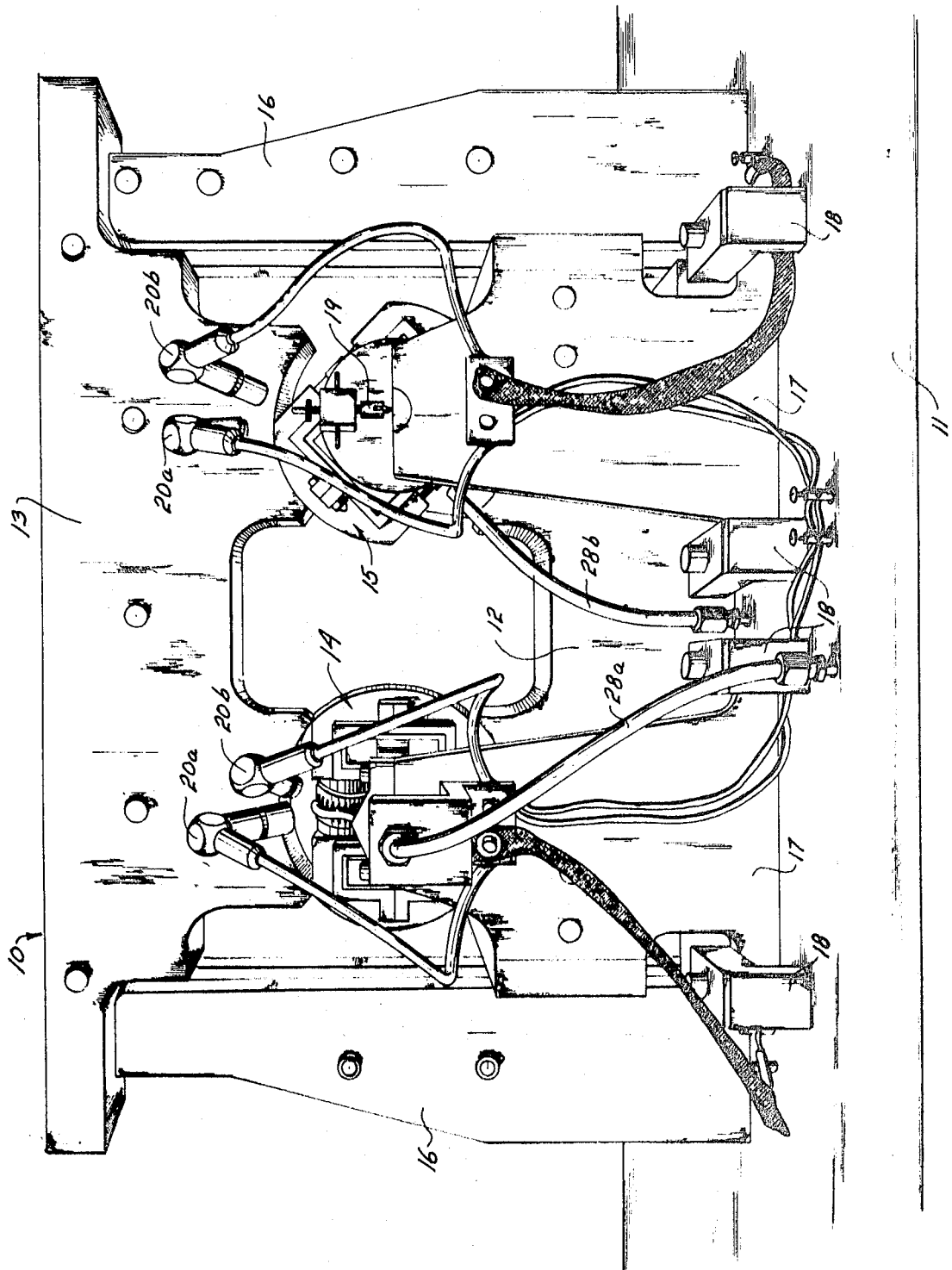
FIG. 1 shows an overall view of equipment constructed in accordance with the principles of the present invention, including means to demonstrate the effect of a time-variant kinemassic force field.
Figure 6:
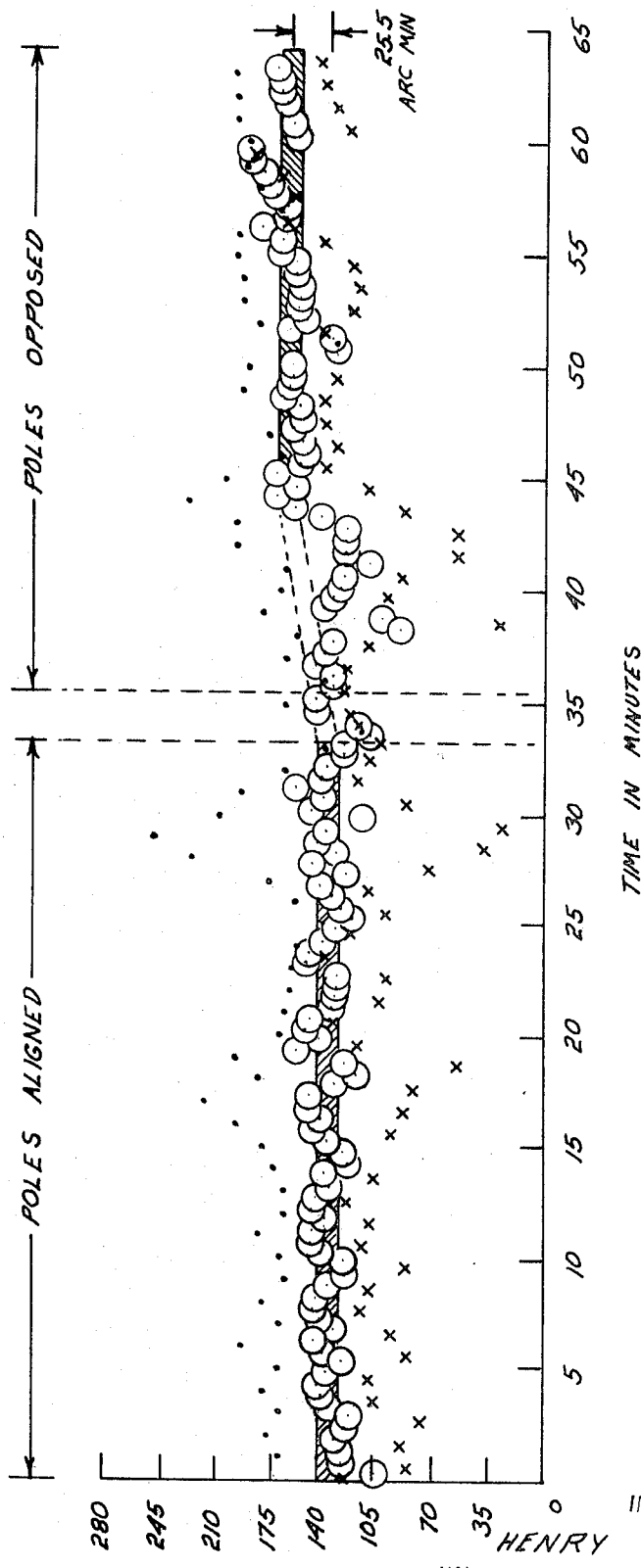
Figure 7A:
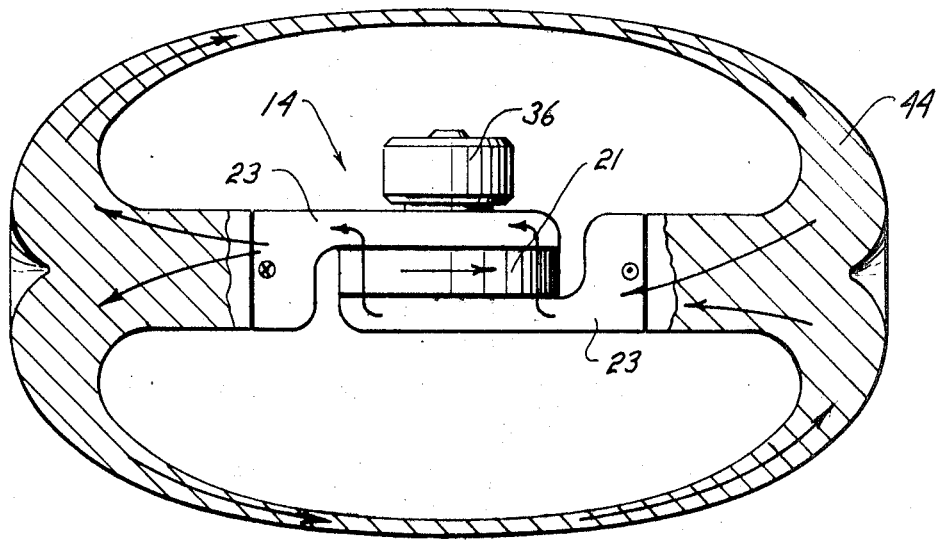
Figure 7B:
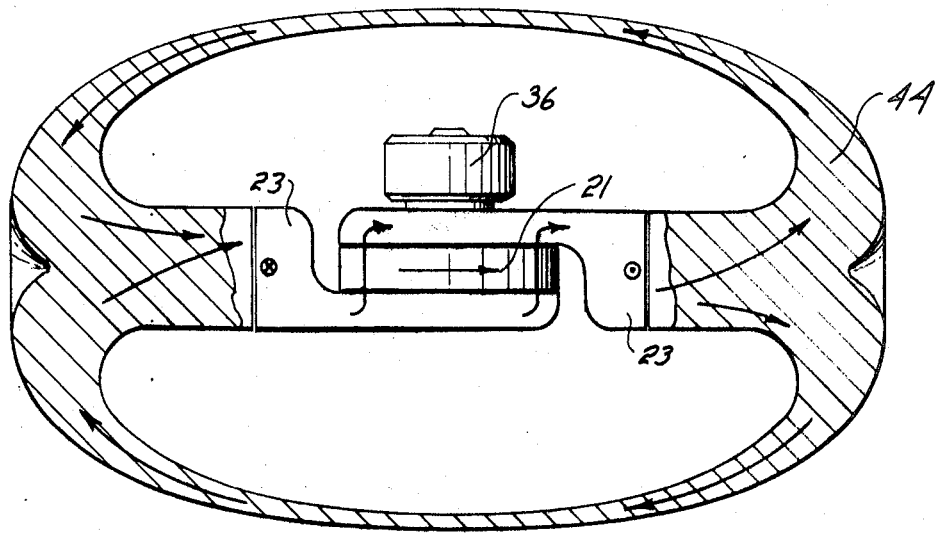

FIG. 6 represents measured changes in operating characteristics of the apparatus of FIGS. 1 and 2 demonstrating the time-variant nature of the kinemassic force field so produced; and FIGS. 7, 7A and 7B are sectioned views of various embodiments of the present invention for demonstrating the time-variant nature of the kinemassic force field as used in establishing a secondary gravitational component.

Before getting into a detailed discussion of the apparatus and the steps involved in the practice of the present invention, it should be helpful to an understanding if the present invention of consideration is first given to certain defining characteristics thereof, many of which bear an analogous relationship to electromagnetic field theory.

A first feature is that the kinemassic field is vectorial in nature. The direction of the field vector is a function of the geometry in which the relative motion between mass particles takes place.

The second significant property of the kinemassic field relates the field strength to the nature of the material in the field. This property may be thought of as the kinemassic permeability by analogy to the concept of permeability in magnetic field theory. The field strength is apparently a function of the density of the spin nuclei material comprising the field circuit members. Whereas the permeability in magnetic field theory is a function of the density of unpaired electrons, the kinemassic permeability is a function of the density of spin nuclei and the measure of magnitude of their half integral spin values. As a consequence of this latter property, the field may be directed and confined by interposing into it denser portions of desired configuration. For example, the field may be in large measure confined to a closed loop of dense material starting and terminating adjacent a system wherein relative motion between masses is occurring.

A further property of the kinemassic force field relates field strength to the relative spacing between two masses in relative motion with respect to one another. Thus, the strength of the resultant field is a function of the proximity of the relatively moving bodies such that relative motion occurring between two masses which are closely adjacent will result in the generation of a field stronger than that created when the same two relatively moving bodies are spaced farther apart.

As mentioned above, a material consideration in generating the kinemassic force field concerns the use of spin nuclei material. By spin nuclei material is meant materials in nature which exhibit a nuclear external angular momentum. This includes both the intrinsic spin of the unpaired nucleon as well as that due to the orbital motion of these nucleons.

Since the dynamic interaction field arising through gravitational coupling is a function of both the mass and proximity of two relatively moving bodies, then the resultant force field is predictably maximized within the nucleus of an atom due to the relatively high densities of the nucleons plus the fact that the nucleons possess both intrinsic and orbital components of angular momentum. Such force fields may in fact account for a significant portion of the nuclear binding force found in all of nature.

It has been found that for certain materials, namely those characterized by a half integral spin value, the external component of angular momentum thereof will be accompanied by a force due to the dynamic interaction of the nucleons.

This is the so-called kinemassic force which on a sub-macroscopic basis exhibits itself as a field dipole moment aligned with the external angular momentum vector. These moments are of sufficient magnitude that they interact with adjacent, or near adjacent, spin nuclei field dipole moments of neighboring atoms.

This latter feature gives rise to a further analogy to electromagnetic field theory in that the interaction of adjacent spin nuclei field dipole moments gives rise to nuclear domain-like structures within matter containing a sufficient portion of spin nuclei material.

Although certain analogies exist between the kinemassic force field and electromagnetic field theory, it should be remembered that the kinemassic force is essentially non-responsive to or affected by electromagnetic force phenomena. This latter condition further substantiates the ability of the kinemassic field to penetrate through and extend outward beyond the ambient electromagnetic field established by the moving electrons in the atomic structure surrounding the respective spin nuclei.

As in electromagnetic field theory, in an unpolarized sample the external components of angular momentum of the nuclei to be subjected to a kinemassic force field are originally randomly oriented such that the material exhibits no residual kinemassic field of its own. However, establishing the necessary criteria for such a force field effects a polarization of the spin components of adjacent nuclei in a preferred direction thereby resulting in a force field which may be represented in terms of kinemassic field flux lines normal to the direction of spin.

The fact that spin nuclei material exhibits external kinemassic forces suggests that these forces should exhibit themselves on a macroscopic basis and thus be detectable, when arranged in a manner similar to that for demonstrating the Barnett effect when dealing with electromagnetic phenomena.

In the Barnett effect a long iron cylinder, when rotated at high speed about its longitudinal axis, was found to develop a measurable component of magnetization, the value of which was found to be proportional to the angular speed. The effect was attributed to the influence of the impressed rotation upon the revolving electronic systems due to the mass property of the unpaired electrons within the atoms.

In an apparatus constructed in accordance with the foregoing principles it was found that a rotating member such as a wheel composed of spin nuclei material exhibits a kinemassic force field. The interaction of the spin nuclei angular momentum with inertial space causes the spin nuclei axes of the respective nuclei of the material being spun to tend to reorient parallel with the axis of the rotating member. This results in the nuclear polarization of the spin nuclei material. With sufficient polarization, an appreciable field of summed dipole moments emanates from the wheel rim flange surfaces to form a secondary dynamic interaction with the dipole moments of spin nuclei contained within the facing surface of a stationary body positioned immediately adjacent the rotating member.

When the stationary body, composed of suitable spin nuclei material, is connected in spatial series with the rotating member, a circuitous form of kinemassic field is created; the flux of which is primarily restricted to the field circuit.

If now means are provided to periodically reverse the direction of rotation of the wheel with respect to the facing surfaces of the stationary body positioned in immediate proximity thereto, then the resultant time-varying kinemassic field generates or induces an accompanying time-varying secondary gravitational field in the space immediately surrounding. That is to say, if the time-varying kinemassic field is made to undulate typically sinusoidally, there will be induced an accompanying undulating secondary gravitational field which is phase-related to the kinemassic field. In this repsect the induced secondary gravitational field is generated in a manner analogous to electromagnetic induction theory.

By properly configuring the undulating kinemassic field, the resultant secondary gravitational field may be essentially restrained to or confined within an enclosed space. Although numerous specific geometric configurations may be proposed, the necessary conditions are established in the preferred embodiment of the present invention by enclosing the kinemassic field generating apparatus, including the rotational members and at least a portion of the stationary member thereof, within an enclosure, the material portions of which obey the rules concerning kniemassic permeability.

The kinemassic field when so configured, will shield the enclosed space both with respect to the secondary gravitational field induced therein and with respect to the ambient gravitational field caused by the earth and other cosmic bodies, existing externally of the shielded space. The undulating kinemassic field, which gives rise to the enclosed secondary undulating gravitational field, is effective in reducing the quantity of flux lines within the space surrounded by the undulating kinemassic field contributed by the ambient gravitational field, thus reducing the mutual force of gravitational attraction acting between this structure and the earth or other cosmic bodies dependent upon their relative contribution to the local gravitational flux density.

It is well known that nature opposes heterogeneous field flux densities. If the normal local flux density contributed by the earth and the other cosmic bodies within the space occupied by and surrounded by the undulating kinemassic field permeable structure were added to by the forcibly enclosed flux of the induced secondary undulating gravitational field, this increased flux density would be in opposition to nature. Although the induced secondary undulating gravitational field would cause an undulating variation of the cosmic or primary gravitational field flux lines of force to penetrate within the kinemassic field permeable structure, if this undulation were sinusoidal, for example, the RMS or 0.707 value of peak reduction in mutual gravitational attraction would apply.

Means for increasing the relative magnitude of the undulating kinemassic field is effected by positioning a mass circuit within the induced secondary field space. The mass circuit in linking with the undulating kinemassic field circuit results in an increase in the kinemassic field and in the same sense effectively intensifies the primary gravitational field shielding. A partial parallel can be found in electromagnetic field theory, where it is known that a shorted secondary turn enhances iron saturation.

The mass circuit located in the induced secondary field space need not be comprised of material having a spin nuclei characteristic; rather, it is more important that this mass circuit have high mass density. A further desirable characteristic of this mass circuit is that it have a capability for mass flow with respect to the undulating kinemassic field structure. Mercury has the desired combination of properties and while other materials may be used, mercury is the most effective thus far known.

As indicated above, the effective result of generating a secondary undulating gravitational field within the space enclosed by the undulating kinemassic field is a relative reduction in apparent weight of the kinemassic field permeable structure, with respect to its apparent weight without such an undulating kinemassic field. The explanation of this phenomenon may be readily conceived as caused by the generation of a field force vector antiparallel in direction to the local gravitational field force vector. If the shielding is sufficiently effective to reduce the density of gravitational field flux lines within the shielded space to the equivalent of the ambient flux line density, there will be no net local distortion of the gravitational field flux line pattern in the space occupied by the kinemassic field permeable material or the space enclosed by the kinemassic field configuration. Without distortion of the local flux line pattern the two bodies cease to mutually attract and, in effect, become weightless, one with respect to the other.

Although similar in result, the technique for effecting the state of weightlessness in the present invention differs from conventional apparatus for achieving such a state of weightlessness. The latter, in general, utilize the force of radial acceleration to effectively "balance" the gravitational forces acting on a body.

The relative magnitude of the undulating kinemassic force field and the kinemassic permeability characterizing the associated structure are both influential in determining the effective shielding of the kinemassic field permeable structure. If the shielding is sufficiently effective so as to reduce the primary gravitational field flux line density within the enclosed space to less than that of the ambient, the distortion of the local gravitational field flux line pattern of reduced flux density would result in the antiparallel field force vector magnitudes exceeding that force of the kinemassic field body's initial weight, i.e., the effective weight of the kinemassic field permeable structure absent the generated undulating kinemassic field. This condition would effectively endow the kinemassic field structure with a negative weight characteristic. As a consequence, the two bodies, that is the kinemassic field body and the earth or other cosmic body, would experience relative motion separating one another along the local primary gravitational field flux lines unless acted upon by other forces.

The hardware required to generate and sustain such an undulating kinemassic field is in part comprised of components which continue to retain a "non-field-energized" weight during the period of field generation. Therefore, the ambient gravitational field flux line pattern within the structure will simultaneously experience zones of both reduced and increased densities. It is the average density of all the zones that determines the magnitude of the antiparallel field force vecor in its opposition to the ambient gravitational field force vector. Bodies located within the shielded space enclosed by the undulating kinemassic field will lose their weight with respect to the body earth in direct proportion to the reduction of ambient gravitational field flux lines which are common to it and the body earth.

As a consequence of the above, the shielding which results in a reduction of mutual attraction between bodies screened by the shielding effected by the undulating kinemassic force field does not violate the principle of equivalence. Thus, two free bodies of different masses, located within the shielded space, will fall within this space toward or away from earth with equal accelerations. Also, the force of mutual gravitational attraction of two or more bodies located within the shielded space will be unaffected by the various degrees of shielding although their free-fall acceleration toward one another will be effected.

Having now further defined the substantiating theory giving rise to the kinemassic forces operative in the present invention, reference is now made to the aforementioned drawings depicting in general an apparatus embodying the defining characteristics outlined above.

From the foregoing discussion, it will be appreciated that both for the purpose of detecting the kinemassic field forces operative in the present invention, and for transforming such forces into energy for doing useful work, several basic apparatus elements are necessary. First, apparatus is needed to enable masses to be placed in relative motion to one another; which relative motion may occur in two mutually orthogonal directions. In order to maximize field strength the apparatus should be capable of generating high velocities between the particles in relative motion. Furthermore, the apparatus should be configured so that the proximity of the particles which are in relative motion is maximized. The necessity of using relatively dense material comprising half integral spin nuclei for the field circuit portion of the apparatus has already been stressed. These and other features are discussed in greater detail below in explanation of the drawings depicting an implementation of the invention.

In considering the drawings, reference will first be made to the general arrangement of components shown in FIGS. 1 and 2. As viewed in FIG. 1, the equipment is mounted upon a stationary base comprising a horizontal structural element 11 which rests upon poured concrete, precast concrete pilings not shown, or other suitable structurally rigid material. It should be made clear at the outset, that the stationary base although not a critical element in its present form nevertheless serves an important function in the subject invention. Thus, the stationary base acts as a stabilized support member for mounting the equipment and, perhaps more significantly, the horizontal portion thereof is of such material that it tends to localize the kinemassic force field to the kinemassic force field generating apparatus proper. This latter feature is discussed in more detail below. The surface uniformity of the horizontal structural element 11 also facilitates the alignment of equipment components. In the reduction to practice embodiment of the present invention a layer of shock absorbing material, not shown, was interposed between the stationary base and the floor.

Shown mounted on the horizontal structural element 11 is the kinemassic force field generating apparatus indicated generally as 10, the lower portion of which is referred to as the lower mass member 12. The lower mass member 12 is not to be confusingly associated with the mass circuit mentioned above as being positioned in the space experiencing the secondary gravitational field. The nature and specific identity of the latter mentioned mass circuit will be more fully explained in connection with the explanation of FIG. 7.

An upper mass member 13 is positioned in mirrored relationship with respect to member 12 and separated somewhat to provide two air gaps therebetween. The lower and upper mass members 12 and 13 function as field circuit members in relationship to a generator 14 and a detector 15 positioned with respective one's of said two gaps. The spatial relationship of the generator 14, the detector 15 and the mass members 12 and 13 is such as to form a kinemassic force field series circuit.

All of the material members of the field circuit are comprised of half integral spin material. For example, the major portion of the generator 14, the detector 15, as well as the upper and lower mass members 13 and 12 are formed of a particular brass alloy containing 89% copper of which both isotopes provide a three-halves proton spin, 10% zinc, and 1% lead as well as traces of tin and nickel. The zinc possesses one spin nuclei isotope which is 4.11% in abundance and likewise the lead also contains one spin nuclei isotope which is 22.6% in abundance. In order to gain an estimate of apparatus size, the upper mass member 13 has an overall length of 56 centimeters and a mass of 43 kilograms.

It will be seen that, by far, the constituents of the mass members are such as satify the criteria of half integral spin nuclei material for those apparatus parts associated with the field and the use of non-spin nuclei material for those parts where it is desired to inhibit the field. Accordingly, all support or structural members, such as the horizontal structural element 11, consist of steel. The iron and carbon nuclei of these structural members are classed as no-spin nuclei and thus represent high relative reluctance to the kinemassic field. Supports 16 are provided to accommodate the suspension of the upper mass member 13. The supports 16 are of steel the same as the horizontal support element 11. The high relative reluctance of steel to the kinemassic field minimizes the field flux loss created in the field series circuit of mass members 12 and 13, the generator 14 and the detector 15. The loss of field strength is further minimized by employing high-reluctance isolation bridges at the point of contact between the lower and upper mass members 12 and 13, and the structural support members 11 and 16.

Shunt losses within the apparatus are in general minimized by employing the technique of minimum mass contact; the use of low field permeability material at the isolation bridges or structural connections; and avoiding bulk mass proximity of non-field generating components.

A number of techniques were devolped for optimizing the isolation bridge units including carboloy cones and spherical spacers. As is depicted more clearly in FIGS. 3, 4 and 5, the structural connection unit ultimately utilized consisted of a hardened 60° steel cone mounted within a set screw and bearing against a hardened steel platen. The contact diameter of the cone against the platen measured approximately 0.007 inch and was loaded within elastic limits. Adjustment is made by means of turning the set screw within a mated, threaded hole.

FIG. 2 is presented in rather diagrammatic form; however, the diagrammatic configuration emphasizes that it consists of a rotatable member corresponding to the generator 14 of FIG. 1 which is "sandwiched" between a pair of generally U-shaped members corresponding to the lower and upper mass members 12 and 13 of FIG. 1. The wheel of generator 14 is mounted for rotation about an axis lying in the plane of the drawing. The generator assembly is also shown as being mounted for rotation about an axis perpendicular to the plane of the drawing; however, the generator assembly may alternatively be oriented to rotate in the plane of the drawing. When member 14 is rotated rapidly with respect to the U-shaped members 12 and 13, a kinemassic field is generated which is normal to the plane defined by the rotating member and within the plane of the drawing. As such, it may be represented in the drawing of FIG. 2, as taking a generally counter-clockwise direction with respect to the field series circuit members.

Referring once more to FIG. 1, it is seen that support for the generator unit 14 is provided by way of a support assembly 17, also fabricated of steel components. The support assembly 17 is in turn clamped to the horizontal structural element 11 by way of bracket assemblies 18.

The detector 15 is of similar configuration to the generator assembly 14, the exception being that the detector assembly is mounted for limited rotation about the axis normal to the plane of the paper. The limited rotational capability is effected by a knife-edge mounting 19 more clearly discernible in FIGS. 3A and 3B. As will become more readily apparent from the discussion of the operation of the embodiment of FIG. 1 which follows, the knife-edge mounting enables a slow sinusoidal oscillation of the detector assembly about its knife-edge axis.

A pair of light-emitting and light-sensing elements 20a and 20b respectively are shown in FIG. 1 in operative relationship to the generator and detector assemblies 14 and 15. The function of the light-generating and-sensing members 20a and 20b is to measure the rate of spin of the generator and detector wheels respectively. For this purpose every other quadrant on the rim surface is painted black. Accordingly, light directed at the rim of the wheel will be reflected by the unpainted quadrants into light-sensing cells associated with a rate-sensing circuit of conventional design. Since the rate-measuring circuit forms no part of the present invention it has not been depicted in the actual drawing nor is it the subject of further explanation.

Compressed air or nitrogen is used to drive the generator and detector wheels. In this respect the compressed gas is directed against turbine buckets 21b cut in the rim of the wheel 21 of both the generator and detector assemblies and such buckets are more readily discernible in FIGS. 3, 4 and 5. The compressed gas is supplied to the generator and detector assemblies by way of air supply lines 28a and 28b.

Figure 3:
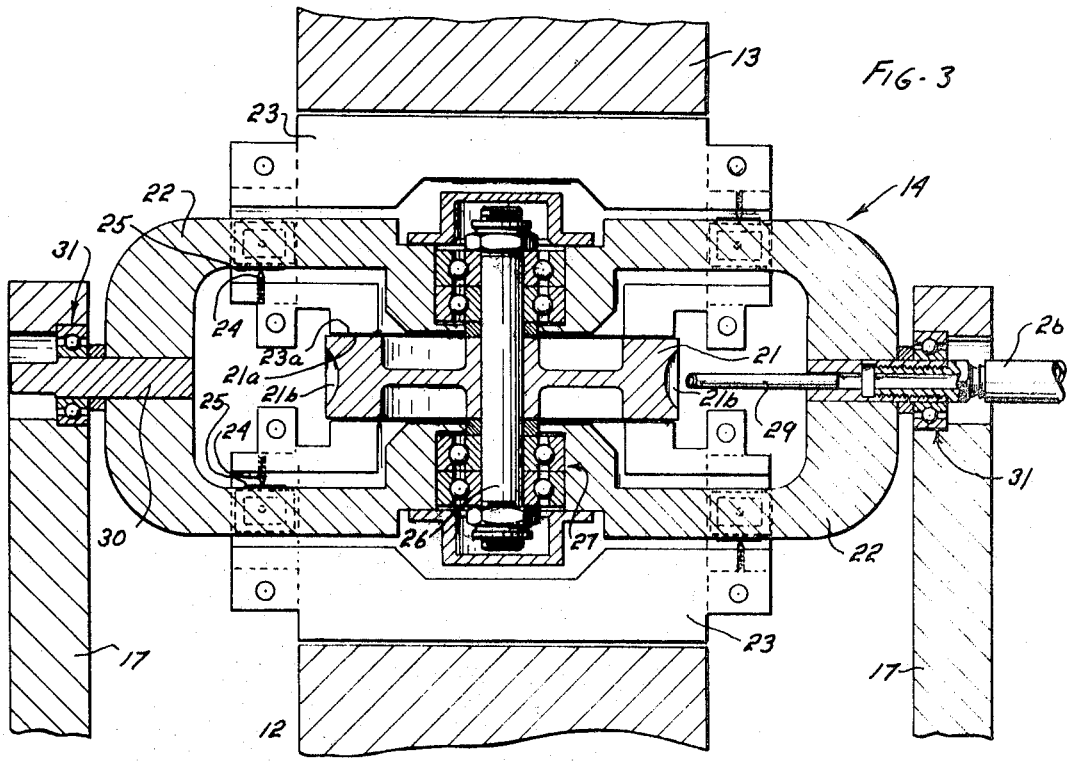
Figure 4:
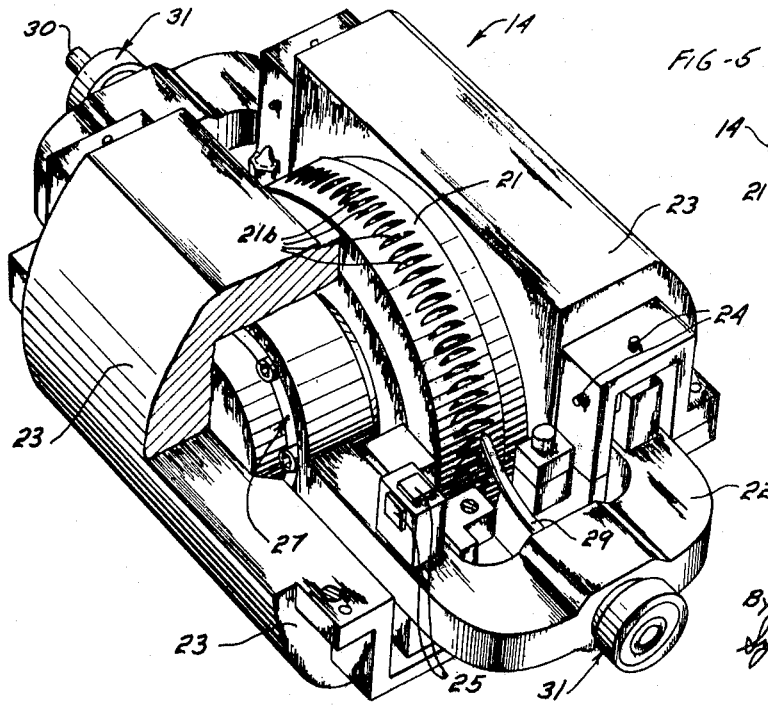
Figure 5:
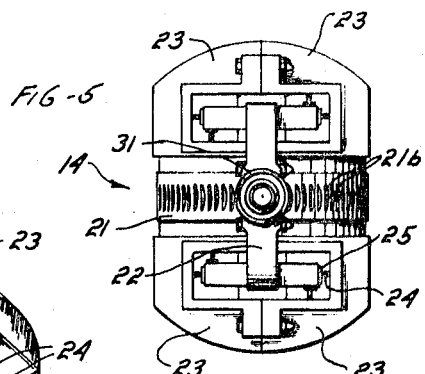

FIGS. 3, 4 and 5 present details of the generator and detector assemblies of FIGS. 1 and 2. In particular, these figures disclose the relationship between a freely rotatable wheel 21, a bearing frame 22, and a pair of pole pieces 23. The bearing frame 22 is of structural steel, and functions to spatially orient the three generator parts without shunting the generated field potential as well as to maintain this orientation against the force moment stresses of precession.

Positioning of the generator wheel 21 with respect to the cooperative faces of the pole pieces 23 is effected by way of the bearing frame upon which the generator wheel is mounted. In this respect the high-reluctance isolation bridges mentioned with respect to FIGS. 1 and 2 are herein shown as set screws 24 which are adjustably positioned to cooperate with hardened steel platens 25. The set screws 24 are mounted on the pole pieces 23 and are adjustably positioned with respect to steel platens 25 cemented to the bearing frame 22 so as to facilitate the centering of the generator wheel 21 with respect to the interface surfaces 23a of the pole pieces 23.

In the implementation of the present invention the air gap formed between the generator wheel rim flanges and the stationary pole pieces 23 was adjusted to a light-rub relationship when the wheel was slowly rotated; as such this separation was calculated to be 0.001 centimeter for a wheel spin rate of 28,000 revolutions per minute due to the resulting hoop tension. In the drawing of FIG. 3 the spacing between the pole pieces 23 and the generator wheel rim flange has been greatly exaggerated to indicate that in fact such a spacing does exist.

The generator wheel 21 utilized in the implementation of the present invention has a 8.60 centimeter diameter and an axial rim dimension of 1.88 centimeters. The rim flange surfaces 21a which are those field emanating areas closely adjacent the surfaces 23a of the pole pieces 23, are each 29.6 square centimeters. The rim portion of the wheel has a volume of 55.7 cubic centimeters neglecting the rim turbine slots 21b.

The generator wheel 21 and an associated mounting shaft 26 are mounted on the bearing frame 22 by means of enclosed double sets of matched high speed bearings 27.

Shaft members 30 carry suitable bearing members 31 for rotatably mounting the generator assembly will respect to a second axis. The support assembly 17 of FIG. 1 is partially represented in FIG. 3, and as noted above provides the mounting means for positioning the generator assembly 14 with respect to the lower and upper mass members 12 and 13.

Reference is now made to FIGS. 3A and 3B which disclose a portion of the detector 15 of FIG. 1 including the knife-edge mounting 19 of FIG. 1. Adjusting means 32 are shown connected to the bearing frame 22a of the detector assembly 15 by means of a disc-like member 33. Attached to the lower portion of the disc 33, and depicted in the end view of the detector assembly of FIG. 3B, is shown a second adjusting member 34, which in combination with equivalent members 32 and 34 mounted on the other end of the detector assembly, provide means for symmetrically aligning the detector assembly within the gap provided by the lower and upper mass members 12 and 13. This further means that the knife-edge assembly is mounted so that the knife-edge axis is coincident with the geometric axis of the detector assembly. At the same time, the center of mass of the detector assembly is located below the geometric center of the detector assembly thereby providing a righting moment to the assembly due to the asymmetry of the mass center with respect to the knife-edge axis. The adjusting means 32 is shown as bearing against the support assembly 17, thereby, in combination with the knife-edge mounting at either end of the detector assembly, providing an effective four point suspension for symmetrically positioning the detector assembly 15 within the end poles of the upper and lower mass members.

In FIGS. 1, 2 and 3 the detector assembly 15 is shown in three different positions. As will become apparent from the discussion of the operation of the subject system which follows, the facility to so reposition the detector assembly is necessary to demonstrate its operative capabilities. Accordingly, the bearing frame 22a is rotatably mounted with respect to the disc 33 by means of a bearing surface interfacing the frame 22a with the shaft 35, the latter being affixed to the face of the disc 33.

Proceeding now to an explanation of the operation of the embodiment of the invention thus far disclosed, it will be appreciated that in accordance with the theory of operation of the present apparatus when the generator wheel is made to spin at rates upwards of 10 to 20 thousand revolutions per minute, effective polarization of spin nuclei within the wheel structure gradually occurs. This polarization gradually gives rise to domain-like structures which continue to grow so as to extend their field dipole moment across the interface separating the rim 21 from the pole pieces 23. Secondary dynamic interaction of gravitational coupling increases the field flux lines around the kinemassic force generating assembly, thus resulting in ever increasing total nuclear polarization of half integral spin nuclei.

The non-electromagnetic forces so generated within the subject apparatus are primarily channeled through the high-kinemassic permeability material defining the series field circuit of the apparatus. The fact that the high speed rotatable wheels of both the generator and detector assemblies are capable of being positioned in a series aiding or series opposing relationship, facilitates the determination of the effective influence of the energies generated in one on the other.

The detector, when carefully balanced on its knife-edges as shown in FIGS. 3A and 3B, exhibits an oscillation period of 11 seconds. When the wheels are energized a stiffening action is induced due to the reaction of the compressed gas impingement against the wheel bucket 21b, since the jet nozzle is fixed with respect to the apparatus base. This results in a reduction of the oscillation period to approximately 6 seconds. A light image not shown is directed against the mirrored face of the knife-edge 19 and reflected onto a calibrated wall screen. Measurements were taken with the apparatus so operative, which measurements established the oscillatory extremes of the reflected light beam for a pole-aligned relationship of the spinning generator and detector wheels. The results of one such set of measurements are recorded in FIG. 6. Therein, the x's and dots represent extremes in deviation while the larger circles represent the mean thereof. The mean was in turn used to establish a null line to be compared with a similar null line derived from poles-opposed orientation of the generator and detector wheels. As a result, a displacement from equilibrium of approximately 13 arc minutes is shown.

In order to maximize the shift of the null line, the field circuit polar relationship of the generator and detector poles was reversed every 30 or 40 minutes from a relation of poles aligned, to poles opposed, to poles aligned. An average null shift of 26 arc minutes is indicated in FIG. 6. That the interaction between generator and detector was in fact accountable for the recorded results was demonstratively supported when the upper mass member was raised so as to create two air gaps one centimeter in length respectively. Predictably, the disruption to the field circuit continuity resulted in the failure of the apparatus to register a shift in the null lines upon reversal of the poles.

Reference is now made to FIG. 7 which discloses an apparatus constructed in accordance with the principles of the present invention for generating a time-variant secondary gravitational field. This apparatus is a mere modification of the apparatus of FIGS. 1 and 2 wherein one detector assembly 15 has been removed and supplementary means are provided to mechanically implement the rotation of the generator assembly 14 about the axis perpendicular to the plane of the paper. These supplementary means are in the nature of an auxiliary motor 36 having a drive pulley 38 adapted to spin the generator assembly 14 about an axis normal to the plane of the drawing and coincident with that of the shaft 30. The shaft 30 carries a pulley 40 which is driven by the motor and pulley assembly 36–38 by way of a conventional drive belt 42. The wheel 21 of the generator assembly 14 is driven in the manner outlined above, namely by means of a source of compressed air not shown.

The supporting assembly depicted in FIG. 7 in partially sectioned form as member 44, is in reality the equivalent of the series mass circuit of FIGS. 1 and 2, inverted or turned inside out so as to form a shield for the kinemassic field generating apparatus. Included as part of the supporting assembly is member 44A which is provided to position the generator assembly 14 in the discontinuity formed in the mass circuit. The kinemassic field generated within the apparatus of FIG. 7 upon energization of the wheel 21 is directed in an enveloping fashion about its generator, being confined in general to the shell. The cross sectional thickness of the shell along equipotential lines must be equal in order to ensure a homogeneous field within the structure. If now the spin rate of the wheel 21 is made to vary, or if the generator assembly 14 is made to rotate about the axis defined by the shaft 30, a time-variant secondary gravitational field is induced in the toroidal space 46.

The secondary gravitational field undulates in a sinusoidal manner with the undulating kinemassic field confined to the series mass circuit. Since the kinemassic field in the dense mass circuit 44 has been restricted through permeability, into an enveloping shell about the generator 14, it follows that the induced undulating secondary gravitational field is likewise restricted primarily to the enclosure 46 as the flux lines of both fields must interlink. In accordance with analogous electromagnetic field theory, the kinemassic field flux lines and the secondary gravitational field flux lines interlink in such manner that, as the kinemassic field alternates, these interlinking loops decay and build up in alternate vector directions in proper phase relation.

A hollow ring member 48 is positioned within the toroidal space 46 and supported thereby a series of fine steel wire spokes 50 secured to the ring and the outer portion of the inverted core housing 44 preferably along points of equipotential of the kinemassic field. Within the hollow ring 48 is contained a dense fluid such as mercury depicted in FIG. 7 generally as member 52. Alternatively, the ring-fluid combination may take the form of a single solid mass. In the latter event the mass circuit would be supported on bearings facilitating its rotation about an axis common to the axis of the generator wheel 21 in order to permit mass flow or rotation of the mass circuit under the influence of the alternating secondary gravitational field. The shielding effected by the design considerations of the toroidal shell 44 with respect to the primary gravitational field reduces the inertial parameter of mass acceleration within the toroidal space 46 in proportion to the ambient gravitational shielding effect. With reduced inertia there will be an appreciable rotational flow displacement of the mass circuit 48–52 for each half cycle of the induced secondary gravitational field, thereby further strengthening the coupling effected between the effective field forces i.e., the primary gravitational field, the kinemassic field and the secondary gravitational field.

Consider now that the apparatus of FIG. 7 is energized such that the wheel 21 spins about its axis creating a uniformly distributed kinemassic field throughout the entire field circuit referred to generally as that encompassed within the inverted core housing 44. As the generator assembly 14 is energized to rotate about the axis passing through shaft 30, a uniformly distributed alternating kinemassic field is established throughout the field circuit.

The presence of the undulating kinemassic field produces a shielding effect within the inverted housing effectively restricting the induced secondary gravitational field while at the same time tending to shield or force out the flux due to the ambient gravitational field. As the spin rates of the wheel and the generator assembly about their respective axes are increased, there results a stronger undulating kinemassic force field of higher frequency. The spin rates may be so varied that a mean gravitatinal flux line density within the apparatus of FIG. 7 exists which is equivalent to the primary gravitational flux line density i.e., that due to the earth and other cosmic bodies. This condition establishes a state of weightlessness or zero gravitational force of attraction with respect to other masses such as earth, for that particular value of gravitational field gradient.

If the spin rates of the wheel and the generator assembly are further increased there results a "bowing-out" or spreading of the gravitational flux lines within the immediate proximity of the apparatus of FIG. 7 so as to result in a lesser local flux line density, thus resulting in the propulsion of the apparatus along the local gravitational field lines of force in a direction diametrically opposed to the local gravitational field force vector.

Because of the nature of the interaction of the primary gravitational field, the secondary gravitational field and the kinemassic field, the secondary gravitational field forces will continue to act upon the apparatus as it passes into lesser gravitational field gradients; however, it will do so with diminishing magnitudes until the local gravitational flux line density about the apparatus of FIG. 7 is no longer effectively diminished thereby. The energy required to propel a vehicle powered by an engine, such as is described above, is accounted for by way of the gravitational field potential energy gained by such a vehicle as it passes to areas of lesser gravitational field intensities. Energy input into this engine would appear as the product of torque and rotational values about the spin axes of both the wheel and the generator assembly, and especially about the latter axis which is responsible for alternating the kinemassic field and thereby generating the secondary gravitational component.

As was mentioned above in explanation of the embodiment of FIGS. 1 and 2, the wheel 21 and the generator assembly 14 are mounted so as to be rotatable in mutually orthogonal directions. It was further mentioned that such orthogonal rotation is not an absolute necessity, it being only necessary that relative motion be established between the wheel 21 and the stationary pole pieces 23. The generator assembly is made to rotate thereby effecting an undulation in the kinemassic field flux in the associated mass circuit. FIG. 7A and 7B disclose a variation of the apparatus of FIG. 7 which satisfies the basic requirements outlined above while at the same time providing certain advantages not available in the aforementioned structure.

In this respect FIGS. 7A and 7B disclose an embodiment wherein the spin axis of the equivalent wheel structure 21 and the generator assembly 14 are concentric thereby eliminating precessional forces present in the embodiment of FIG. 7 due to the rotation of the respective members about the two mutually orthogonal axes. The absence of precessional forces permits a close tolerance to be established between the cooperating faces of the wheel structure 21, the pole pieces 23 and the mass circuit 44.

The embodiment of FIGS. 7A and 7B is also to be preferred to that of FIG. 7 in that the design of the generator assembly of the former permits the energization of the independently rotatable members 21 and 23 by means of a single motor 36 differentially geared so as to effect the rotation of the wheel 21 at a speed far in excess of that of the generator assembly, and as indicated, in a reverse direction thereto.

Also indicated in the embodiment of FIGS. 7A and 7B is the orientation of the flux within the mass circuit, the latter being constructed preferredly of bismuth. It should be understood that the direction of flux within the mass circuit reverses with each reverseal in orientation of the equivalent pole pieces 23 due to the rotation of the generator assembly 14.

It will be apparent from the foregoing description that there has been provided an apparatus for generating time-variant kinemassic forces due to the dynamic interaction of relatively moving bodies. Although in its disclosed application, the time-variant kinemassic force has been described in relation to its function of generating a secondary gravitational force, it should be readily apparent that other equally basic applications of these forces are contemplated.

Thus, in addition to providing an effective propulsion technique, the principles of the present invention may be utilized for the purpose of generating localized areas of gravitational shielding for housing medical patients for which such weight reductions would be beneficial. In addition, the principles may be adapted to laboratory use, as for example the analysis of the effects of a sustained reduction of "g" value upon astronauts and for specialized manufacturing techniques.

While in accordance with the provisions of the statutes there has been illustrated and described the best form of the invention known, it will be apparent to those skilled in the art that changes may be made in the apparatus described without departing from the spirit of the invention as set forth in the appended claims, and that in some cases, certain features of the invention may be used to advantage without a corresponding use of other features.

Having now described the invention, what is claimed as new and for which it is desired to secure Letters Patent is:

1. An apparatus for establishing a time-variant kinemassic force field resulting from the relative motion of moving bodies, comprising a generator assembly independent portions of which are mounted to assume relative rotational motion about at least a single axis located within said generator assembly, a mass circuit of dense material of discontinuous configuration, means for positioning said generator assembly within said mass circuit discontinuity, and means for initiating independent relative rotational motion of said generator assembly portions whereby an undulating kinemassic force field is established within said mass circuit.

2. Apparatus according to claim 1 further characterized in that said mass circuit and said relatively moving portions are comprised of spin nuclei material.

3. An apparatus according to claim 1 wherein said mass circuit is further characterized by first and second U-shaped members positioned in mirrored relationship with respect to each other and displaced somewhat so as to form two gaps therebetween, one of said gaps corresponding to said mass circuit discontinuity and being adapted to receive said generator assembly and the other said gap being adapted to receive a detector assembly.

4. Apparatus constructed in accordance with claim 1 wherein said mass circuit is further characterized by a shell of generally toroidal configuration having a cylindrical central portion within which is located said mass circuit discontinuity.

5. An apparatus constructed in accordance with claim 2 wherein said generator assembly mounted within said mass circuit discontinuity further comprises a rotatable member, a frame, means for mounting said rotatable member on said frame, pole pieces mounted on said frame on either side of said rotatable member, each pole piece presenting a generally circular face in close proximity to but spaced from a face of said rotatable member, means for effecting the rotation of said rotatable member about a first axis, and means for rotating said frame about a second axis oriented perpendicular to said first axis.

6. Apparatus constructed in accordance with claim 4 and further characterized by a dense mass ring mounted within the walls of said shell structure by mounting means establishing small area contact between said mass ring and said shell structure.

7. An apparatus constructed in accordance with claim 6 wherein said dense mass ring is further comprised of a hollow shell housing a liquid metal of suitable density.

8. Apparatus according to claim 6 wherein said dense mass ring has as its axis the axis of revolution defining the surface of said shell.

9. Apparatus constructed according to claim 3 wherein said shell is further characterized as being of equal cross sectional area normal to the kinemassic field lines of force.

10. A method of generating a time-variant kinemassic force field including the steps of:
juxtaposing in field series relationship a first member comprised of spin nuclei material of half integral spin value and a second member similarly constituted, portions of said first member being adapted to assume relative rotational motion about at least a single axis;
initiating the independent rotation of said first member about at least a single axis whereby an undulating kinemassic force field is established therein;
and so configuring said second member as to confine said undulating kinemassic force field thereto whereby a time-variant secondary gravitational force field is induced in the surrounding space.

No references cited

HARLAND S. SKOGQUIST, Primary Examiner

UNITED STATES PATENT OFFICE
CERTIFICATE OF CORRECTION

Patent No. 3,626,605                    Dated December 14, 1971

Inventor(s) Henry W. Wallace

It is certified that error appears in the above-identified patent and that said Letters Patent are hereby corrected as shown below:

IN THE SPECIFICATION

Column 1, lines 19 to 42, should appear as a part of the "Abstract of the Disclosure".

Column 2, line 31, "three" should read --there--.

Column 3, line 31, "if" should read --of--.

Column 3, line 32, "of" should read --if--.

Column 7, line 51, "with" should read --within--.

Column 8, line 73, "rate-sensing" should read --rate-measuring--.

Column 11, line 10, "one" should read --the--.

Column 13, line 15, "reverseal" should read --reversal--.

Signed and sealed this 5th day of September 1972.

(SEAL)
Attest:

EDWARD M. FLETCHER, JR.                ROBERT GOTTSCHALK
Attesting Officer                      Commissioner of Patents